US011071970B2

(12) United States Patent
Sree et al.

(10) Patent No.: US 11,071,970 B2
(45) Date of Patent: Jul. 27, 2021

(54) CRYSTALLINE ZEOLITES WITH ERI/CHA INTERGROWTH FRAMEWORK TYPE

(71) Applicant: Umicore AG & Co. KG, Hanau-Wolfgang (DE)

(72) Inventors: Sreeprasanth Pulinthanathu Sree, Heverlee (BE); Stef Jules Peter Kerkhofs, Heverlee (BE); Elke Jane June Verheyen, Mechelen (BE); Johan Adriaan Martens, Huldenberg (BE); Frank-Walter Schuetze, Aschaffenburg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 16/345,718

(22) PCT Filed: Nov. 16, 2017

(86) PCT No.: PCT/EP2017/079440
§ 371 (c)(1),
(2) Date: Apr. 28, 2019

(87) PCT Pub. No.: WO2018/091583
PCT Pub. Date: May 24, 2018

(65) Prior Publication Data
US 2019/0351399 A1    Nov. 21, 2019

(30) Foreign Application Priority Data

Nov. 18, 2016    (EP) .................................. 16199703

(51) Int. Cl.
| | |
|---|---|
| *B01J 29/80* | (2006.01) |
| *B01D 53/94* | (2006.01) |
| *B01J 29/56* | (2006.01) |
| *B01J 29/76* | (2006.01) |
| *B01J 37/00* | (2006.01) |
| *B01J 37/03* | (2006.01) |
| *B01J 37/04* | (2006.01) |
| *B01J 37/08* | (2006.01) |
| *B01J 37/30* | (2006.01) |
| *B01J 29/14* | (2006.01) |
| *B01J 29/072* | (2006.01) |
| *B01J 29/06* | (2006.01) |

(52) U.S. Cl.
CPC .......... *B01J 29/80* (2013.01); *B01D 53/9418* (2013.01); *B01J 29/072* (2013.01); *B01J 29/146* (2013.01); *B01J 29/56* (2013.01); *B01J 29/763* (2013.01); *B01J 37/0018* (2013.01); *B01J 37/031* (2013.01); *B01J 37/04* (2013.01); *B01J 37/08* (2013.01); *B01J 37/30* (2013.01); *B01D 2255/50* (2013.01); *B01J 2029/062* (2013.01); *B01J 2229/18* (2013.01); *B01J 2229/186* (2013.01)

(58) Field of Classification Search
CPC ........ B01J 29/56; B01J 29/146; B01J 29/072; B01J 29/763; B01J 29/80; B01J 29/723; B01J 29/084; B01J 29/7015; B01J 2029/062; B01J 2229/18; B01J 2229/186; B01J 37/0018; B01J 37/031; B01J 37/04; B01J 37/08; B01J 37/30; C01B 39/023; B01D 53/9418; B01D 2255/50
USPC ............... 502/60, 66, 67, 69, 70, 74, 76, 64; 423/700, 701, 702, 709, 710, 716, 235, 423/239.1, 239.2
See application file for complete search history.

(56) References Cited

U.S. PATENT DOCUMENTS

| | | |
|---|---|---|
| 4,148,713 A | 4/1979 | Rollmann |
| 4,394,251 A | 7/1983 | Miller |
| | (Continued) | |

FOREIGN PATENT DOCUMENTS

| | | |
|---|---|---|
| EP | 1992409 A1 | 11/2008 |
| EP | 2517774 A2 | 10/2012 |
| | (Continued) | |

OTHER PUBLICATIONS

Anderson et al., "Intergrowths of cubic and hexagonal polytypes of faujasitic zeolites", Jul. 26, 1991, pp. 1660-1664, vol. 23, Publisher: J. Chem. Soc., Chem. Commun.
(Continued)

*Primary Examiner* — Elizabeth D Wood
(74) *Attorney, Agent, or Firm* — Suzannah K Sundby, Esq.; Canady + Lortz LLP

(57) ABSTRACT

The present invention relates to crystalline zeolites with an ERI/CHA intergrowth framework type and to a process for making said zeolites. The ERI content of the zeolites ranges from 10 to 85 wt.-%, based on the total weight of ERI and CHA. The zeolites may further comprise 0.1 to 10 wt.-% copper, calculated as CuO, and one or more alkali and alkaline earth metal cations in an amount of 0.1 to 5 wt.-%, calculated as pure metals. The process for making the zeolites with an ERI/CAH intergrowth framework type comprises a) the preparation of a first aqueous reaction mixture comprising a zeolite of the faujasite framework type, Cu-TEPA and a base M(OH), b) the preparation of a second aqueous reaction mixture comprising a silica source, an alumina source, an alkali or alkaline earth metal chloride, bromide or hydroxide, a quaternary alkylammonium salt and hexamethonium bromide, c) combining the two reaction mixtures, and d) heating the combination of the two reaction mixtures to obtain a zeolite with an ERI/CHA intergrowth framework type. The ERI/CHA intergrowth zeolite may subsequently be calcined. The zeolites according to the present invention are suitable SCR catalysts.

20 Claims, 3 Drawing Sheets

(56) References Cited

U.S. PATENT DOCUMENTS

| | | | |
|---|---|---|---|
| 4,394,362 | A | 7/1983 | Miller |
| 6,334,994 | B1 | 1/2002 | Wendelbo et al. |
| 7,094,389 | B2 | 8/2006 | Cao et al. |
| 2002/0165089 | A1 | 11/2002 | Janssen et al. |
| 2010/0290963 | A1* | 11/2010 | Andersen .................. B01J 29/56 423/213.2 |
| 2012/0014867 | A1* | 1/2012 | Bull .......................... B01J 29/68 423/700 |
| 2012/0184429 | A1* | 7/2012 | Andersen ........... B01D 53/9418 502/61 |

FOREIGN PATENT DOCUMENTS

| | | |
|---|---|---|
| EP | 2517775 A2 | 10/2012 |
| EP | 2517777 A2 | 10/2012 |
| WO | 2005063623 A2 | 7/2005 |
| WO | 2009141324 A1 | 11/2009 |
| WO | 2011073390 A2 | 6/2011 |
| WO | 2011073398 A2 | 6/2011 |
| WO | 2011112949 A1 | 9/2011 |
| WO | 2014090698 A1 | 6/2014 |
| WO | 2015084817 A1 | 6/2015 |
| WO | 2016100105 A2 | 6/2016 |
| WO | 2016177924 A1 | 11/2016 |

OTHER PUBLICATIONS

Breck, "Zeolite Molecular Sieves: Structure, Chemistry, and Use, Chapter 4", 1974, pp. 245-378, Publisher: John Wiley and Sons.

Chen et al., "TMA-offretite. Relationship between structural and catalytic properties", 1984, pp. 24-31, vol. 86, No. 1, Publisher: Journal of Catalysis.

De Vos Burchart, "Ordered overgrowth of zeolite X onto crystals of zeolite A", Sep. 1989, pp. 432-435, vol. 9, No. 5, Publisher: Zeolites.

Goossens et al., "Synthesis and Characterization of Epitaxial FAUonEMT Zeolite Overgrowth Materials", 2001, pp. 1167-1181, Publisher: Eur. J. Inorg. Chem.

Leonowicz et al., "Proposed synthetic zeolite ECR-1 structure gives a new zeolite framework topology", Oct. 29, 1987, pp. 919-821, vol. 329, Publisher: Nature.

Millward et al., "Evidence for semi-regularly ordered sequences of mirror and inversion symmetry planes in ZSM-5/ZSM-11 shape-selective zeolitic catalysts", 1983, pp. 1075-1082, vol. 79, Publisher: J. Chem. Soc., Faraday Trans. 2.

Rao et al., "Intergrowth structures: the chemistry of solid-solid interfaces", Apr. 1, 1985, pp. 113-119, vol. 18, No. 4, Publisher: Acc. Chem. Res.

Thomas et al., "Direct, real-space determination of intergrowths in ZSM-5/ZSM-11 catalysts", Jul. 14, 1982, pp. 1380-1383, Publisher: J. Chem. Soc., Chem. Commun.

Treacy et al., "Two new three-dimensional twelve-ring zeolite frameworks of which zeolite beta is a disordered intergrowth", Mar. 17, 1988, pp. 249-251, vol. 332, Publisher: Nature.

Treacy et al., "Intergrowth segregation in FAU-EMT zeolite materials", Apr. 9, 1996, pp. 813-840, vol. 452, No. 1947, Publisher: Royal Society.

Wise et al., "The chemical compositions and origin of the zeolites offretite, erionite, and levyne", 1976, pp. 853-858 630, vol. 61.

International Search Report received in PCT/EP2017/079440 dated Feb. 1, 2018.

Written Opinion received in PCT/EP2017/079440 dated Feb. 1, 2018.

* cited by examiner

CRYSTALLINE ZEOLITES WITH ERI/CHA INTERGROWTH FRAMEWORK TYPE

The present invention relates to crystalline zeolites with an ERI/CHA intergrowth framework type and to a process for making said zeolites. The zeolites according to the present invention are suitable for selective catalytic reduction (SCR) of $NO_x$.

Zeolites are microporous aluminosilicate materials which have very regular pore structures and channels of molecular dimensions and which occur in numerous framework structures. They are classified by the Structure Commission of the International Zeolite Association (IZA) which defines respective framework types. The commission also assigns framework type codes consisting of three capital letters to all unique and confirmed framework topologies. For example, a widely used group of zeolites belongs to the erionite framework to which the code ERI has been assigned, and another widely used group belongs to the chabazite framework, encoded CHA. Zeolites can differ by framework type, as well as by chemical composition, atom distribution, crystal size and morphology.

It is common to classify zeolites according to their pore size which is defined by the ring size of the biggest pore aperture. Zeolites with a large pore size have a maximum ring size of 12 tetrahedral atoms, zeolites with a medium pore size have a maximum pore size of 10 and zeolites with a small pore size have a maximum pore size of 8 tetrahedral atoms. Well-known small-pore zeolites belong in particular to the AEI, CHA (chabazite), ERI (erionite), LEV (levyne) and KFI framework. Examples having a large pore size are zeolites of the faujasite (FAU) framework type.

Zeolites play an important role as catalysts in the so-called selective catalytic reduction (SCR) of nitrogen oxides with ammonia to form nitrogen and water, and in particular if cations like copper and iron are included in the zeolite pores. The SCR process has been widely used to remediate exhaust gases which result from the combustion of fossil fuels, in particular from stationary power plants and from vehicles powered by diesel engines. While zeolites occur in nature, zeolites intended for SCR or other industrial applications are usually manufactured via synthetic processes.

Furthermore, zeolites are well-known ion exchangers. They can also be used as molecular sieves and as catalysts in a large variety of reactions. Well-known uses of zeolites include, for instance, fluid catalytic cracking, hydrocracking, hydrocarbon conversion reactions, reprocessing methods and heat accumulation.

The phase-pure zeolite frameworks used in a diversity of industrial applications are exceptions in the field of zeolite crystallization. The majority of zeolite crystallization conditions result in the formation of physical mixtures of different zeolite phases or intergrowth materials. Only when the synthesis parameters are finely tuned, a pure zeolite phase is obtained.

Zeolites can be made by hydrothermal synthesis usually involving alkaline cations, such as Li, Na or K, earth alkaline cations, such as Ca or Sr, or quaternary ammonium cations. These cations will be present as extra-framework species necessary for, e.g. charge compensating tetrahedral aluminium atoms. If Cu or Fe loaded zeolites are envisaged, these cations normally need to be replaced with copper and/or iron cations by post-synthesis methods. This can be done by an additional synthesis step as for example described in WO 2011/073390 A2 and WO 2011/073398 A2.

Also one-step synthesis processes for the production of Cu containing zeolites are already known. Examples for the preparation of Cu containing zeolites can be found, for instance, in WO 2009/141324 A1 and WO 2015/084817 A1.

WO 2009/141324 A1 relates to a hydrothermal process for the preparation of phosphor-free zeolitic materials having a CHA framework structure. In said process, an aqueous solution comprises tri- and/or tetravalent elements employed as framework elements and also all the Cu necessary for the preparation of the final Cu zeolite having a CHA framework structure. The trivalent element preferably is Al, and the tetravalent element preferably is selected from Si, Sn, Ti, Zr, Ge and a mixture of two or more thereof.

WO 2015/084817 A1 discloses a transition-metal-CHA molecular sieve and a mixed-template synthesis for making it. The transition metal is preferably Cu or Fe. The reaction mixture for synthesizing the zeolite comprises of an alumina and a silica source, a transition-metal-amine organic templating agent, seed crystals, and a second organic templating agent, wherein each of the templating agents is suitable for forming a CHA framework structure. The second organic templating agent is a quaternary organic ammonium salt.

EP 2 517 774 A2 discloses a zeolite catalyst for converting nitrogen oxides into nitrogen in an SCR, wherein the zeolite has the ERI framework type code and contains 0.01 to 20 weight percent of at least one transition metal selected from the group consisting of Cr, Ce, Mn, Fe, Co, Ni and Cu. In some embodiments, the catalyst may additionally comprise another transition metal-containing small pore zeolite having the CHA framework type code. However, it deals with a physical mixture of ERI and CHA framework type zeolites, but not with an intergrowth. The SCR catalyst according to this invention shows a good thermal stability and good $NO_x$ conversion rates up to about 400° C. EP 2 517 775 A2, belonging to the same family as EP 2 517 774 A2, discloses a zeolite catalyst for converting nitrogen oxides into nitrogen in an SCR, wherein the zeolite is a small pore zeolite and has a framework code type selected from the group consisting of AFT, AFX, ATT, DDR, EAB, EPI, GIS, GOO, IHW, LTA, MER, OWE, PAU, PHI, RHO, RTH, SAV, SIV, UEI, UFI, VNI and YUG and contains 0.1 to 10 weight percent of at least one transition metal selected from the group consisting of Cr, Mn, Fe, Co, Ce, Ni, Cu, Zn, Ga, Mo, Ru, Rh, Pd, Ag, In, Sn, Re, Ir and Pt. These catalysts also show a good thermal stability and good $NO_x$ conversion rates up to about 400° C. EP 2 517 777 A2, which is yet another member of the same family to which also EP 2 517 774 A2 and EP 2 517 775 A2 belong, discloses a zeolite catalyst for an SCR comprising two or more zeolites having the CHA framework type and 0.01 to 20 weight percent of at least one transition metal selected from the group consisting of Cr, Mn, Fe, Co, Ce, Ni, Cu, Zn, Ga, Mo, Ru, Rh, Pd, Ag, In, Sn, Re, Ir and Pt. The thermal stability and the $NO_x$ conversion rates are comparable to the catalysts described in EP 2 517 774 A2 and EP 2 517 775 A2, respectively.

Building on the classification proposed by Rao and Thomas, the different types of intergrowths relevant to zeolites are epitaxial and polytypical intergrowths, see C N R Rao and J M Thomas: "Intergrowth Structures: The Chemistry of Solid-Solid Interfaces", Acc Chem Res 1985, 13, 113-119. Epitaxy involves the oriented overgrowth of a zeolite crystal by a compositional or structurally different zeolite phase, whereas polytypism arises when individual sheets in a layered material are stacked in different sequences.

There are some cases of epitaxy reported in literature. Examples are the structural overgrowth of zeolite X on zeolite A (E de Vos Burchart, J C Jansen, H van Bekkum: "Ordered overgrowth of zeolite X onto crystals of zeolite A", Zeolites 1989, 9, 423-435), zeolite P on zeolite A (Breck, Zeolite Molecular Sieves: Structure, Chemistry and Use, John Wiley & Sons, New York, 1974), or FAU/EMT overgrowth materials (A M Goossens, B H Wouters, P J Grobet, V Buschmann, L Fiermans, J A Martens: "Synthesis and Characterization of Epitaxial FAU-on-EMT Zeolite Overgrowth Materials", Eur J Inorg Chem 2001, 1167-1181). A schematic overview of zeolites and their intergrowths as presented in Goossens et al., Eur J Inorg Chem 2001, 1167-1181, is shown in FIG. 1.

Within the ABC-6 material family, also known as the chabazite group, an OFF/LEV overgrowth exists (W S Wise and R W Tschernich: "The chemical compositions and origin of the zeolites offretite, erionite, and levyne", Am Mineral 1976, 61, 853-863).

Examples of a compositional overgrowth can be found in the combination of ZSM-5 or ZSM-11 and silicalite-1: U.S. Pat. No. 4,148,713 discloses aluminosilicate zeolites containing an outer aluminium-free shell. The outer shell is essentially $SiO_2$ that has crystallized on the zeolite surface in the ZSM-5 type configuration. U.S. Pat. No. 4,394,251 discloses hydrocarbon conversion processes with crystalline silicates surrounded by an alumina containing isostructural shell. The crystalline silicates are preferably siliceous analogues of intermediate pore size zeolites such as ZSM-5 and ZSM-11, and the outer shell comprises of a crystalline aluminosilicate. U.S. Pat. No. 4,394,362 discloses crystalline silicate particles having an inner portion comprising an intermediate pore size crystalline silicate such as ZSM-5 or ZSM-11 which is substantially free of aluminium and an aluminium-containing isostructural outer shell.

As intergrowth, polytypism is a more common phenomenon in zeolite crystallization. It can be pictured as a stacking of different structurally uniform domains in each individual crystal, without any mismatch of bonds. The two, or more, types of domains can be structurally related, for example when they represent a different periodicity. This most often occurs as an alternative stacking of a common sheet, such as in FAU/EMT (MW Anderson, K S Pachis, F Prébin, S W Carr, O Terasaki, T Ohsuna and V Alfredsson: "Intergrowths of Cubic and Hexagonal Polytypes of Faujasitic Zeolites", J Chem Soc Chem Commun 1991, 1660-1664; and M M J Treacy, D E W Vaughan, K G Strohmaier and J M Newsam, "Intergrowth Segregation in FAU-EMT Zeolite Materials", Proc R Soc Lond A—Math Phys Eng Sci, 1996, 452, 813-840) or MFI/MEL (J M Thomas and G R Millward: "Direct, Real-space Determination of Intergrowths in ZSM-5/ZSM-11 Catalysts", J Chem Soc Chem Commun 1982, 1380-1383; and G R Millward, S Ramdas and J M Thomas: "Evidence for Semi-regularly Ordered Sequences of Mirror and Inversion Symmetry Planes in ZSM-5/ZSM11 Shape-selective Zeolitic Catalysts", J Chem Soc Faraday Trans 1983, 79, 1075-1082). Sometimes they have substantially different structures such as in MAZ/MOR (M E Leonowicz and D E W Vaughan: "Proposed synthetic zeolite ECR-1 structure gives a new zeolite framework topology", Nature 1987, 329, 819-821) and the *BEA, a family of distorted zeolite materials (M M J Treacy and J M Newsam: "Two new three-dimensional twelve-ring zeolite frameworks of which zeolite beta is a disordered intergrowth", Nature 1988, 332, 249-251). The stacking pattern can then vary from a strict alternation to domain arrangements with no periodicity at all.

Specifically for the ABC-6 zeolite family of materials, polytypism as an intergrowth is well known. Materials belonging to the ABC-6 family are for example chabazite, offretite, erionite, gmelinite, sodalite and levyne. The structure of zeolite materials in the ABC-6 family can be represented as a stacking of layers containing planar six-rings (6Rs). The 6Rs in one layer can be connected to the next layers of 6Rs in different ways. The three different locations of the 6Rs in a layer can be given as A, B or C. The 6Rs in the different layers can be connected parallel to each other (position A) or by a shift (position B and C), resulting in different frameworks belonging to the ABC-6 family. For example, offretite can be represented by three connecting layers with a stacking sequence of AAB, whereas the erionite contains 6 unique layers with a sequence of AABAAC. A stacking fault between one of these layers, where the stacking sequence is slightly altered at some places, easily occurs and results in intergrowths of different framework types. An example where the AAB stacking sequence of OFF zeolite is randomly replaced by AABAAC, or vice versa, is called an ERI/OFF intergrowth with the ERI and OFF framework type the end members of the ingrowth series. Zeolite T and ZSM-34 are the most common examples. Examples of materials that can make intergrowths with chabazite are zeolites with the GME and AEI framework type. Within the ABC-6 family, other intergrowths are theoretically possible, such as an intergrowth of chabazite (AABBCC) and offretite (AAB). However, besides the above mentioned intergrowths of ERI/OFF and CHA with GME or AEI, no other intergrowths have been reported.

Many of the intergrowth materials show special catalytic, sorptive or molecular separation properties compared to their phase pure endmembers. This can be seen for the ERI/OFF in catalytic dewaxing (N Y Chen, J L Schlenker, W E Garwood and G T Kokotailo: "TMA-Offretite. Relationship between Structural and Catalytic Properties", J Catal 1984, 86, 24-31) and for MFI/MEL intergrowth in the methanol to hydrocarbon conversion (J M Thomas and G R Millward: "Direct, Real-space Determination of Intergrowths in ZSM-5/ZSM-11 Catalysts", J Chem Soc Chem Commun 1982, 1380-1383).

Furthermore, several intergrowths based on chabazite and a second small-pore zeolite are known:

WO 2011/112949 A1 discloses one or more transition metals selected from Cr, Mn, Fe, Co, Ce, Ni, Cu, Zn, Ga, Mo, Ru, Rh, Pd, Ag, In, Sn, Re, Ir and Pt supported on a support. The support material has a molecular sieve having at least one intergrowth phase that has a least two different small-pore, three dimensional framework structures. Preferably, the first or second framework structure is selected from AEI, GME, AFX, AFT and LEV, and the other framework structure is CHA. The molecular sieves of WO 2011/112949 A1 may be synthesized using a synthesis technique as disclosed in U.S. Pat. No. 6,334,994 B1, U.S. Pat. No. 7,094,389 B2, US 2002/0165089 A1 and WO 2005/063623 A2. U.S. Pat. No. 6,334,994 B1 discloses a silico-aluminophosphate intergrowth with AEI and CHA structures. It is manufactured from a mixture of $SiO_2$, $Al_2O_3$ and $P_2O_5$ and an organic template material. Said mixture is manufactured by combining at least one portion of the Al-source and the P-source with water, the Si-source and the organic template material. The reagents can be added in different orders and quantities, and from different sources, but Al-isopropoxide, phosphoric acid, colloidal silica and tetraethylammonium hydroxide have proved to be particularly useful sources of Al, P, Si and organic template material, respectively.

U.S. Pat. No. 7,094,389 B2 and WO 2005/063623 A2, both belonging to the same patent family, disclose a crystalline material substantially free of framework phosphorus and comprising both a CHA and an AEI framework type molecular sieve. The crystalline material, in its calcined, anhydrous form, further comprises oxides $X_2O_3$ and $YO_2$. X is a trivalent element such as Al, B, Fe, In and/or Ga, and Y is a tetravalent element such as Si, Sn, Ti and/or Ge. The crystalline material is made by preparing a reaction mixture comprising a source of water and sources of the oxides $X_2O_3$ and $YO_2$, maintaining said reaction mixture under conditions sufficient to form crystals of the crystalline material comprising stacking faults or at least one intergrown phase of a CHA framework type molecular sieve and an AEI framework type molecular sieve, and recovering the crystalline material thus obtained. Preferably, organic directing agents for directing the formation of a CHA and/or an AEI framework type are also added to the mixture. The directing agents can be organic amine or ammonium compounds. Furthermore, the reaction mixture may comprise seed crystals having an AEI, OFF, CHA or LEV framework type. US 2002/0165089 A1 relates to a silicoaluminophosphate molecular sieve comprising at least one intergrown phase having AEI and CHA framework types. These molecular sieves are prepared by submitting a mixture comprising a reactive source of silicon, a reactive source of aluminium and a reactive source of phosphorus in the presence of an organic structure directing agent to hydrothermal treatment under autogenous pressure. Preferably, the organic structure directing agent is a tetraethylammonium compound.

The zeolites known so far and the processes for making them have several disadvantages. For example, the thermal stability of some zeolites used as SCR catalysts is not sufficient in higher temperature ranges. Thus, there is a need for zeolites having a higher thermal stability. Furthermore, the processes for making known zeolites involve several process steps including crystallization of the final product at about 150° C. at high pressure which results in a high energy consumption. Some zeolites comprise copper, but the raw zeolites obtained by known processes mostly do not comprise copper. Desired CuO contents lie between 0.1 and 10 wt.-% of the zeolite. As a consequence, an ion exchange step to insert CuO in the zeolite is required. On the other hand, one-pot zeolite synthesis procedures exist, in which zeolite formation and CuO incorporation are combined. However, known one-pot processes comprise a copper content that is too high for practical application of said zeolite. Therefore, an ion exchange step to remove excess copper is required in many of the known processes. Furthermore, the processes of the prior art often require the use of expensive templates for the formation of small-pore zeolites.

Problem to be Solved by the Invention

It is therefore an object of the present invention to provide novel zeolites with an enhanced thermal stability and a process for making them, wherein the process is flexible in the sense that it allows to manufacture a wide variety of small-pore zeolites with respect to the content of transition metals, Si/Al ratio (SAR), and which does not require the use of expensive templates.

Solution of the Problem

The inventors of the present invention have now found that it is surprisingly possible to provide such novel zeolites with an enhanced thermal stability. This first object of the present invention is therefore achieved by crystalline aluminosilicate zeolites comprising an intergrowth of a CHA framework type material and an ERI framework type material.

The novel crystalline aluminosilicate zeolites according to the present invention and the process for making them are explained below, with the invention encompassing all the embodiments indicated below, both individually and in combination with one another.

As used in the present invention, the term "phase-pure zeolite" refers to a zeolite that is composed of crystals having only one crystal structure, i.e. the crystals contain no other crystal structure.

A crystal structure is a description of the ordered arrangement of atoms, ions, or molecules in a crystalline material. Ordered structures occur from the intrinsic nature of the constituent particles to form symmetric patterns that repeat along the principal directions of three-dimensional space in matter. A "crystal" therefore represents a solid material whose constituents are arranged in a crystal structure.

A "crystalline substance" is composed of crystals.

A "zeolite framework type", also referred to as "framework type", represents the corner-sharing network of tetrahedrally coordinated atoms.

A "CHA framework type material" is a zeolitic material having a CHA framework type.

The same applies, mutatis mutandis, for an "ERI framework type material".

An "intergrowth" of a zeolite comprises at least two different zeolite framework types or two different zeolite compositions of the same framework type.

In an "overgrowth" zeolite, one framework structure grows on top of the other one. Thus, "overgrowth" represents a species of "intergrowth", and "intergrowth" is the genus.

The crystalline aluminosilicate zeolites according to the present invention are hereinafter referred to as "the zeolites" or "the zeolites according to the present invention", respectively.

The zeolites according to the present invention comprise an intergrowth of a CHA framework type and an ERI framework type. In a preferred embodiment, said intergrowth is an overgrowth. The terms "intergrowth" and "overgrowth" as used for the zeolites according to the present invention includes a) an ERI framework structure growing on top of a CHA framework structure, b) a CHA framework structure growing on top of an ERI framework structure and c) mixtures of a) and b).

In one embodiment of the present invention, the ERI content of the zeolites ranges from 10 to 85 wt.-%, based on the total weight of ERI and CHA. Preferably, the ERI content is in the range of between 25 and 80 wt.-%, even more preferably, the ERI content is in the range of between 50 to 80 wt.-%, and most preferably, the ERI content is in the range 40 and 60 wt.-%. The determination of the ERI and CHA contents, respectively, is based on the analysis of the XRD pattern by identifying the relative amount of ERI and CHA in the ERI/CHA intergrowth.

In one embodiment of the present invention, the silica to alumina molar ratio of the zeolites ranges from 2 to 60, preferably 10 to 30, and even more preferably 10 to 20. Hereinafter, the silica to alumina molar ratio is abbreviated as SAR.

In one embodiment of the present invention, the zeolites comprise copper or a mixture of copper and iron in an amount of 0.1 to 10 wt.-%, preferably 1.5 to 6 wt.-%, even more preferably 1.5 to 3.5 wt.-%, calculated as the respective oxides CuO and $Fe_2O_3$ and based on the total weight of the respective zeolite.

In a preferred embodiment of the present invention, the zeolites comprise 0.1 to 10 wt.-% copper, preferably 1.5 to 6 wt.-% Cu, even more preferably 1.5 to 3.5 wt.-% Cu, calculated as copper oxide CuO and based on the total weight of the respective zeolite.

In one embodiment of the present invention, the copper to aluminium atomic ratio of the zeolites is in the range of between 0.002 to 0.5.

In one embodiment of the present invention, the zeolites comprise one or more alkali or alkaline earth metal cations selected from the group consisting of lithium, sodium, potassium, rubidium, cesium, ammonium, magnesium, calcium, strontium, and barium cations. It is well known to the skilled person that the ammonium cation $NH_4^+$ has very similar properties to heavier alkali metal cations. Therefore, the ammonium cation $NH_4^+$ is considered an alkali cation in the present invention, which is in accordance with common practice. In a preferred embodiment, the alkali or alkaline earth metal cation is a sodium cation, a potassium cation, or a mixture of sodium and potassium cations. The one or more alkali or alkaline earth metal cations are present in an amount of 0.1 to 5.0 wt.-%, preferably 0.3 to 2.0 wt.-%, calculated as pure metals and based on the total weight of the zeolites. In case of ammonium cations, their content is calculated via combustion analysis that are well known to the skilled person.

In one embodiment of the present invention, the crystalline aluminosilicate zeolites according to the present invention consist of an intergrowth of a CHA framework type material and an ERI framework type material.

In another embodiment of the present invention, the crystalline aluminosilicate zeolites according to the present invention comprise an intergrowth of a CHA framework type material and an ERI framework type material, and, in addition, phase-pure ERI and/or CHA.

In both of these embodiments, the SAR ranges from 2 to 60, preferably 10 to 30, and even more preferably 10 to 20, as mentioned above.

In a preferred embodiment of the present invention, the zeolites of the present invention comprise and intergrowth of a CHA framework type and an ERI framework type and additionally comprise the following features:
  The ERI content of the zeolites ranges from 10 to 85 wt.-%, based on the total weight of ERI and CHA.
  The SAR ranges from 2 to 60.
  The zeolites comprise copper in an amount of 0.1 to 10 wt.-%, calculated as CuO.
  The copper to aluminium atomic ratio of the zeolites is in the range of between 0.002 to 0.5.
  The zeolites comprise sodium cations, potassium cations, or a mixture of sodium and potassium cations in an amount of 0.3 to 5 wt.-%, calculated as pure metals and based on the total weight of the zeolites.

In another preferred embodiment of the present invention, the zeolites of the present invention comprise and intergrowth of a CHA framework type and an ERI framework type and additionally comprise the following features:
  The ERI content of the zeolites ranges from 10 to 85 wt.-%, based on the total weight of ERI and CHA.
  The SAR ranges from 10 to 30.
  The zeolites comprise copper in an amount of 0.1 to 10 wt.-%, calculated as CuO.
  The copper to aluminium atomic ratio of the zeolites is in the range of between 0.005 to 0.5.
  The zeolites comprise sodium cations, potassium cations, or a mixture of sodium and potassium cations in an amount of 0.3 to 5 wt.-%, calculated as pure metals and based on the total weight of the zeolites.

In a preferred embodiment of the present invention, the zeolites of the present invention comprise and intergrowth of a CHA framework type and an ERI framework type and additionally comprise the following features:
  The ERI content of the zeolites ranges from 10 to 85 wt.-%, based on the total weight of ERI and CHA.
  The SAR ranges from 10 to 20.
  The zeolites comprise copper in an amount of 0.1 to 10 wt.-%, calculated as CuO.
  The copper to aluminium atomic ratio of the zeolites is in the range of between 0.005 to 0.5.
  The zeolites comprise sodium cations, potassium cations, or a mixture of sodium and potassium cations in an amount of 0.3 to 5 wt.-%, calculated as pure metals and based on the total weight of the zeolites.

The object to provide a process for making the crystalline aluminosilicate zeolites according to the present invention comprises the following steps:
  a) preparing a first aqueous reaction mixture comprising a zeolite of the faujasite framework type, Cu-tetraethylenepentamine (Cu-TEPA) and at least one compound M(OH), wherein M is a sodium, potassium or ammonium cation or a mixture thereof,
  b) preparing a second aqueous reaction mixture comprising
    a silica source,
    an alumina source,
    at least one salt AB or $AB_2$, wherein the cation A is chosen from lithium, sodium, potassium, rubidium, cesium, ammonium, magnesium, calcium, strontium, and barium and the anion B is chosen from chloride, bromide, iodide and hydroxide, and
    a quaternary alkylammonium salt having the general formula $[NR1R2R3R4]^+X^-$, wherein R1, R2, R3 and R4 represent, independently from one another, a linear or branched alkyl group having 1 to 10 carbon atoms and X— is chosen from bromide, iodide and hydroxide, and
    a hexamethonium bromide, iodide or hydroxide,
  c) combining the two aqueous reaction mixtures,
  d) heating the combination of the two aqueous reaction mixtures to form a crystalline aluminosilicate zeolite comprising
    an intergrowth of a CHA framework type material and an ERI framework type material, and
    cations chosen from lithium, sodium, potassium, rubidium, cesium, ammonium, magnesium, calcium, strontium and barium cations and mixtures thereof, and
    copper cations.

In step a) of the process according to the present invention, the three components, i.e. the zeolite of the faujasite framework type, Cu-TEPA and the at least one compound M(OH) can be mixed in any order. However, it is preferred to suspend the zeolite in an aqueous solution of the at least one compound M(OH) first and then to add a solution of Cu-TEPA.

Preferably, the at least one compound M(OH) and Cu-TEPA are used in step a) in the form of 0.5 to 2 M aqueous solutions.

Zeolites of the faujasite network type are known and commercially available in a large variety under the name zeolite Y. In particular, a large amount of faujasites with different SARs are available which allows easy control of the SAR of the resulting copper-containing small pore zeolite.

In embodiments of the inventive process, the zeolite of the faujasite framework type has a SAR in the range from 5 to 60.

Likewise, the copper content of the resulting copper-containing small-pore zeolite can be easily controlled via the amount of copper complex used in the inventive process.

In embodiments of the inventive process, the copper content of the copper containing small-pore zeolite is 0.1 to 10 wt.-%, in particular 1.5 to 6 wt.-% and particularly preferably 1.5 to 3.5 wt.-%, calculated as CuO and based on the total weight of the copper containing small-pore zeolite.

The copper complexing agent tetraethylenepentamine used in the inventive process is known and commercially available. Tetraethylenepentamine is also referred to as "TEPA". The corresponding copper complex Cu-TEPA can be manufactured in line with known processes, see for example the description "synthesis of Cu-TEPA" among the embodiments described below.

In embodiments of the inventive process, the copper complex is used in an amount of 0.0001 mole/wt Cu-TEPA/FAU zeolite to 0.0016 mole/wt Cu-TEPA/FAU zeolite.

In the compound M(OH) used in step a) of the process according to the present invention, M is sodium, potassium, ammonium or a mixture thereof. In other words, M(OH) is NaOH, KOH, $NH_4OH$ or a mixture thereof. Preferably, M(OH) is NaOH, $NH_4OH$, or a mixture of both.

The use of NaOH, KOH and/or $NH_4OH$ in combination with Cu-TEPA in step a) ensures that the faujasite framework type zeolite is transformed into a CHA framework type.

In embodiments of the inventive process, M(OH) is used in an amount of 0.001 mole/wt M(OH)/FAU zeolite to 0.025 mole/wt M(OH)/FAU zeolite.

The zeolite of the faujasite framework type, Cu-TEPA and the at least one compound M(OH) are stirred for 15 min at room temperature after mixing. The first reaction mixture obtained thereof may either be used immediately for mixing with the second reaction mixture, or it may be kept static at a temperature between room temperature and 150° C., preferably 90 to 98° C., for 36 to 60 h, preferably 48 h, before mixing it with the second reaction mixture.

Suitable silica sources to be used in step b) of the process according to the present invention are commercially available stabilized silica sols and fumed silicas. A suitable commercially available silica source is, for instance, Ludox® AS-40. Furthermore, alkoxysilanes such as tetraethoxysilane (TEOS) and tetramethoxysilane (TMOS) can be used as silica sources.

Suitable alumina sources are, for instance, aluminium-tri-sec-butoxide $Al[O(CH)(CH_3)C_2H_5]_3$, aluminiumnitrate, aluminiumsulfate, sodium aluminate, aluminium powder and aluminium hydroxide.

In one embodiment, the amounts of the silica and the alumina source are chosen in a way that the calculated SAR of the starting composition ranges between 10 and 100, preferably between 50 and 80. The skilled person knows that the SAR in the synthesis and the SAR in the final zeolite are not necessarily identical, and he also knows how to choose SAR values in the synthesis in order to obtain a desired SAR in the final zeolite.

The second reaction mixture according to step b) further comprises at least one salt AB or $AB_2$, wherein the cation A is chosen from lithium, sodium, potassium, rubidium, cesium, ammonium, magnesium, calcium, strontium, and barium cations, and the anion B is chosen from chloride, bromide, iodide and hydroxide. "At least one salt AB or $AB_2$," means that either only one salt is chosen, or it can be a mixture of two or more salts. In case two or more salts are used, at least two of them may either share the same cation (e.g. KBr and KCl) or the same anion (e.g. NaCl and KCl), or it may deal with at least two salts having different cations and different anions (e.g. NaCl and KBr). In a preferred embodiment, the cation is chosen from Na and K, and the anion is chosen from chloride and bromide.

The quaternary alkylammonium cation has the general formula $[NR1R2R3R4]^+$ wherein R1, R2, R3 and R4 represent, independently from one another, linear or branched alkyl groups having 1 to 10 carbon atoms. The linear or branched alkyl groups are selected from methyl, ethyl, n-propyl, isopropyl, 1-butyl, 2-butyl, tert.-butyl, 1-pentyl, 2-pentyl, 3-methyl-butyl, 2,2,-dimethyl-propyl as well as all isomers of hexyl, heptyl, octyl, nonyl, decyl.

Preferably, the quaternary alkylammonium salt is tetra-ethylammoniumhydroxide.

Hexamethonium bromide, iodide or hydroxide is used to form ERI.

In a preferred embodiment, the preparation of the second reaction mixture according to step b) is carried out as follows: the alumina source is added to an aqueous solution of the quaternary alkylammonium salt upon stirring at room temperature for 2 to 30 min. Then, the aqueous suspension of the silica source is added at room temperature within 5 to 15 minutes upon stirring. Afterwards, the hexamethonium bromide, iodide or hydroxide is added, followed by the addition of the at least one salt AB or $AB_2$ dissolved in deionized water.

Subsequently, the solution is stirred for another 18 to 30 h, preferably 24 h, at room temperature, thereby forming a liquid gel. This gel is then aged for another 36 to 60 h, preferably 48 h, without stirring, at room temperature.

The skilled person knows how to adjust the contents of the zeolite of the faujasite framework type, the at least one compound M(OH), Cu-TEPA, silica, alumina and the salt AB or $AB_2$ in order to obtain a zeolite with a desired SAR, alkali or alkaline earth metal and copper content. He can apply said knowledge without departing from the scope of the claims.

According to step c) of the process of the present invention, the two reaction mixtures obtained from steps a) and b), respectively, are mixed. The first reaction mixture may be added to the second one or vice versa, or the first and the second reaction mixture may be mixed concomitantly with one another. In a preferred embodiment, the second reaction mixture is added within 2 to 5 minutes at room temperature to the first reaction mixture. The resulting mixture is homogenized by stirring at room temperature for 10 to 20 minutes.

The heating step d) is carried out at temperatures between 95° C. and 160° C. for 3 to 28 days under autogenous pressure. In one embodiment, the heating step is carried out at 95° C. for 21 days. In another embodiment, the heating step is carried out at 160° C. for 4 to 8 days. The skilled person knows that it is reasonable to combine higher temperatures with shorter reaction times and vice versa. He can make use of this knowledge without leaving the scope of protection of the claims.

The solid product obtained by this heating step is then filtered off and washed with deionized ater, and then dried at 50 to 80° C., preferably 60° C., for 8 to 16 h.

Optionally, the zeolite obtained from step d) may subsequently be calcined. It is advantageous to carry out the calcination at a temperature of 700 to 800° C., preferably 740 to 760° C. Preferably, the oven is heated slowly, for instance at 0.5 to 2° C./min. After the final calcination temperature of 740 to 760° C. is reached, it is held for 6 to 10 hours. Afterwards, the heating is switched off, and the zeolite is allowed to cool down to room temperature.

Furthermore, the zeolite obtained after calcination may be ion-exchanged in order to reduce the amount of alkali, alkaline earth metal and copper cations. Ion-exchange methods are well known in the state of the art and may be applied without departing from the scope of the claims. Ion exchange may be achieved, for instance, by treatment with aqueous ammonium chloride solutions. The calcined zeolite is mixed with an aqueous $NH_4Cl$ solution and heated up to boiling point. The zeolite is recovered by filtration and washing with deionized water and then dried. Repeating this procedure for one or more times further reduces the content of alkali, alkaline earth metal and copper cations.

If the zeolites obtained by the process according to the present invention shall comprise a mixture of copper and iron, said iron is preferably introduced after calcination. The introduction may be carried out by techniques well known in the prior art, e.g. by incipient wetness impregnation or by ion exchange techniques. In both cases, appropriate iron precursors are dissolved in water and brought into contact with the zeolite according to the present invention. Appropriate iron precursors are $Fe^{2+}$ and $Fe^{3+}$ salts whose solubility in water is equal to or larger than 1 g per 100 g water. Suitable iron precursors are, for instance, $FeSO_4*7H_2O$, $FeCl_2*4H_2O$, $FeBr_2*6H_2O$, $Fe(NO_3)_3*9H_2O$, $FeCl_3*6H_2O$. Preferably, a $Fe^{3+}$ salt is used as an iron precursor. After the introduction of Fe, the zeolite is washed, dried and calcined. This general procedure is also well-known in the art and can be applied without departing from the scope of the claims.

The ERI/CHA intergrowths according to the present invention can be used for the preparation of SCR catalysts. Furthermore, they are suitable ion exchangers. They can also be used as molecular sieves and as catalysts in a large variety of reactions. Well-known uses of zeolites include, for instance, fluid catalytic cracking, hydrocracking, hydrocarbon conversion reactions, reprocessing methods and heat accumulation.

Exhaust emissions of vehicles driven by a predominantly lean combustion engine contain, next to particle emission, in particular the primary emissions carbon monoxide CO, hydrocarbons HC, and nitrogen oxides NON. Due to the relatively high oxygen content of up to 15 vol. %, carbon monoxide and hydrocarbons can be rendered harmless by oxidation fairly easy, but the reduction of the nitrogen oxides to nitrogen is much more difficult to achieve.

An SCR catalyst containing a zeolite according to the present invention, i.e. a crystalline zeolite with an ERI/CHA intergrowth framework type, may be manufactured by well-known methods.

The SCR catalysts may, for instance, be obtained by solid state sublimation. For this purpose, a dry, intimate mixture of the zeolite and a copper salt is made. Said mixture is then heated to a temperature of 550 to 900° C., whereby the copper salt decomposes into the metal (i.e. copper) or the copper ion. Subsequently, the mixture is heated at a temperature and for a time span sufficient to achieve the solid state sublimation of copper into the zeolite framework material. Said process is often referred to as "solid state ion exchange".

The powder thus obtained is then dispersed in water and mixed with a binder. Suitable binders are, for example, boehmite and silica gel. Afterwards, this mixture comprising water, a binder, and the zeolite only needs to be stirred or homogenized, respectively, and may be applied directly as a coating suspension to coat a carrier substrate. The coating suspension is hereinafter referred to as the "washcoat".

In some embodiments of the SCR catalysts according to the present invention, said SCR catalyst is present in the form of a coating on a carrier substrate. Carrier substrates can be so-called flow-through substrates or wall-flow filters, respectively.

Both carrier substrate may consist of inert materials, such as silicon carbide, aluminium titanate, cordierite or metal. Such carrier substrates are well-known to the skilled person and available on the market.

In other embodiments, the carrier substrates may be catalytically active on their own, and they may comprise catalytically active material, e.g. SCR-catalytically active material. SCR-catalytically active materials which are suitable for this purpose are basically all materials known to the skilled person, for example catalytically active materials based on mixed oxides, or catalytically active materials based on ion-exchanged zeolitic compounds. For instance, iron- and copper-exchanged zeolitic compounds are well known catalytically active materials. Furthermore, mixed oxides comprising compounds of vanadium, titanium and tungsten are particularly suitable for this purpose.

In addition to the catalytically active material, these carrier substrates comprise a matrix component. All inert materials which are otherwise used for the manufacturing of catalyst substrates may be used as matrix components in this context. It deals, for instance, with silicates, oxides, nitrides or carbides, with magnesium aluminium silicates being particularly preferred.

In other embodiments of the SCR catalysts according to the present invention, the catalyst itself forms part of the carrier substrate, for example as part of a flow-through substrate or a wall-flow filter. Such carrier substrates additionally comprise the matrix components described above.

Carrier substrates comprising the SCR catalysts according to the present invention may be used as such in exhaust purification. Alternatively, they may be coated with catalytically active materials, for example with SCR-catalytically active materials. Insofar as these materials shall exhibit an SCR catalytic activity, the SCR catalysts mentioned above are suitable materials.

In one embodiment, catalytically active carrier materials are manufactured by mixing 10 to 95 wt.-% of an inert matrix component and 5 to 90 wt.-% of a catalytically active material, followed by extruding the mixture according to well-known protocols. As already described above, inert materials that are usually used for the manufacture of catalyst substrates may be used as the matrix components in this embodiment. Suitable inert matrix materials are, for example, silicates, oxides, nitrides and carbides, with magnesium aluminium silicates being particularly preferred.

The application of the catalytically active catalyst onto either the inert carrier substrate or onto a carrier substrate which is catalytically active on its own as well as the application of a catalytically active coating onto a carrier substrate, said carrier substrate comprising a catalyst according to the present invention, can be carried out following manufacturing processes well known to the person skilled in the art, for instance by widely used dip coating, pump coating and suction coating, followed by subsequent thermal post-treatment (calcination).

The skilled person knows that in the case of wall-flow filters, their average pore sizes and the mean particle size of the catalysts according to the present invention may be adjusted to one another in a manner that the coating thus obtained is located onto the porous walls which form the channels of the wall-flow filter (on-wall coating). However, the average pore sizes and the mean particle sizes are preferably adjusted to one another in a manner that the catalyst according to the present invention is located within the porous walls which form the channels of the wall-flow filter. In this preferable embodiment, the inner surfaces of the pores are coated (in-wall coating). In this case, the mean particle size of the catalysts according to the present invention has to be sufficiently small to be able to penetrate the pores of the wall-flow filter.

The catalysts according to the present invention may advantageously be used for the exhaust purification of lean combustion engines, in particular for diesel engines. They convert nitrogen oxides comprised in the exhaust gas into the harmless compounds nitrogen and water.

Commonly known exhaust gas purification systems are often formed by arranging an oxidation catalyst (DOC) having an oxidative function for nitrogen monoxide and hydrocarbon and aforementioned selective catalytic reduction type catalyst (SCR) having an oxidative function layer in the subsequent stage thereof, in a flow path of exhaust gas, characterized in that a spraying means to supply an urea aqueous solution or an aqueous ammonia solution is arranged in the downstream of the aforementioned oxidation catalyst and in the upstream of aforementioned selective catalytic reduction type catalyst. Furthermore, a diesel particulate filter (DPF) for filtering out soot is often combined with the DOC and the SCR. In these arrangements, combustible particle components are deposited on the DPF and combusted therein. Such arrangements are, for instance, disclosed in EP 1 992 409 A1. Widely used arrangements of such catalysts are, for example (from upstream to downstream):

(1) DOC+($NH_3$)+SCR
(2) DOC+DPF+($NH_3$)+SCR
(3) DOC+($NH_3$)+SCR+DPF
(4) DOC+($NH_3$)+SCR+DOC+DPF.

In the above examples (1) to (4), ($NH_3$) represents a position where an urea aqueous solution, an aqueous ammonia solution, ammonium carbamate, ammonium formiate or the like is supplied as a reducing agent by spraying. The supply of such urea or ammonia compounds in automotive exhaust gas purification systems is well known in the art.

Hence, the present invention furthermore refers to a method for the purification of exhaust gases of lean combustion engines, characterized in that the exhaust gas is passed over a catalyst according to the present invention.

In a preferred embodiment of the process according to the present invention, ammonia is used as the reducing agent. The ammonia required may, for instance, be formed within the exhaust purification system upstream to a particulate filter by means of an upstream nitrogen oxide storage catalyst ("lean NOx trap"—LNT). This method is known as "passive SCR".

Alternatively, ammonia may be supplied in an appropriate form, for instance in the form of urea, ammonium carbamate or ammonium formiate, and added to the exhaust gas stream as needed. A widespread method is to carry along an aqueous urea solution and to dose it into the catalyst according to the present invention via an upstream injector as required.

The present invention thus also refers to a system for the purification of exhaust gases emitted from lean combustion engines, characterized in that it comprises a catalyst according to the present invention, preferably in the form of a coating on a carrier substrate or as a component of a carrier substrate, and an injector for aqueous urea solutions, wherein the injector is located upstream of the catalyst of the present invention.

For example, it is known from SAE-2001-01-3625 that the SCR reaction with ammonia proceeds more rapidly if the nitrogen oxides are present in a 1:1 mixture of nitrogen monoxide and nitrogen dioxide, or if the ratios of both nitrogen oxides are close to 1:1.

As the exhaust gas from lean combustion engines generally exhibits an excess of nitrogen monoxide over nitrogen dioxide, this SAE paper suggests to increase the amount of nitrogen dioxide by means of an oxidation catalyst. The exhaust gas purification process according to the present invention may not only be applied in the standard SCR reaction, i.e. in the absence of nitrogen dioxide, but also in the rapid SCR reaction, i.e. when part of the nitrogen monoxide has been oxidized to nitrogen dioxide, thus ideally providing a 1:1 mixture of nitrogen monoxide and nitrogen dioxide.

The present invention therefore also relates to a system for the purification of exhaust gases from lean combustion engines, characterized in that it comprises an oxidation catalyst, an injector for aqueous urea solutions and a catalyst according to the present invention, preferably in the form of a coating on a carrier substrate or as a component of a carrier substrate.

In a preferred embodiment of the exhaust gas purification system according to the present invention, a platinum group metal, preferably platinum, palladium or mixtures or combinations thereof supported on a carrier support material is used as an oxidation catalyst.

Any carrier material for platinum which is known to the skilled person as suitable material may be used without departing from the scope of the claims. Said materials show a BET surface area of 30 to 250 $m^2$/g, preferably 100 to 200 $m^2$/g (measured according to DIN 66132). Preferred carrier substrate materials are alumina, silica, magnesium dioxide, titania, zirconia, ceria and mixtures and mixed oxides comprising at least two of these oxides. Particularly preferred materials are alumina and alumina/silica mixed oxides. If alumina is used, it is preferably stabilized, for instance with lanthanum oxide.

The exhaust gas purification system is arranged in an order wherein, in flow direction of the exhaust gas purification system, an oxidation catalyst is arranged first, followed by an injector for an aqueous urea solution, and finally a catalyst according to the present invention.

EMBODIMENTS

Synthesis of Cu-TEPA

Figure 1:
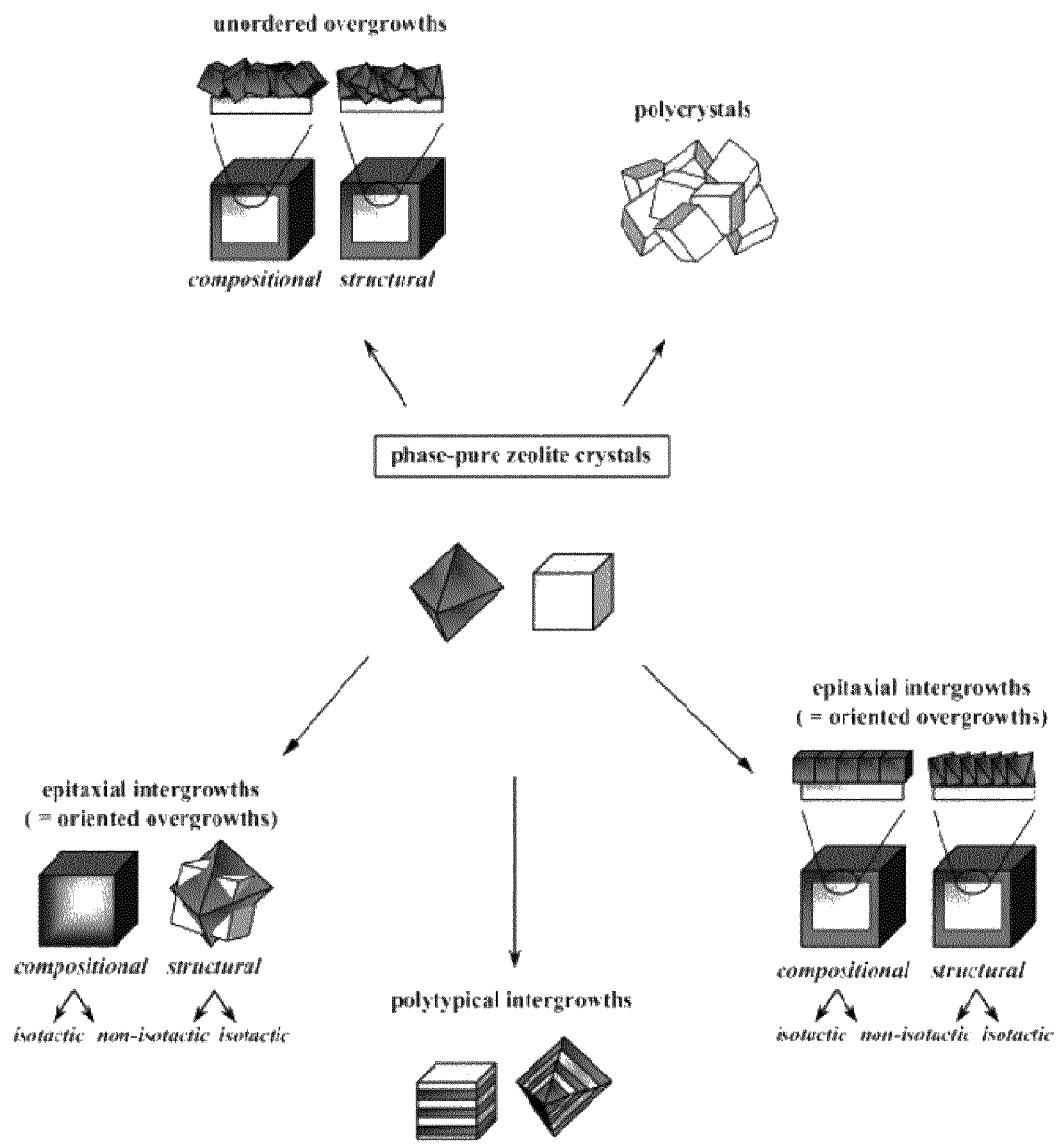
FIG. 1 is a schematic overview of zeolites and their intergrowths as presented in Goossens et al., Eur J Inorg Chem 2001, 1167-1181.

The Cu-tetraethylenepentamine complex (Cu-TEPA) was synthesized by adding 37.9 g tetraethylenepentamine (0.2 mole, Sigma-Aldrich) to a solution consisting of 50 g $CuSO_4*5H_2O$ (0.2 mole, Sigma-Aldrich) and 200 g of $H_2O$ (1 M solution) at room temperature upon stirring. This solution continued stirring for 2 h at room temperature.

Embodiment 1

3 g of zeolite Y with SAR=30 (Si/Al=15) (CBV-720, Zeolyst International) was suspended in 27 mL of a 1.2 M solution of sodium hydroxide at room temperature. To this solution 1.5 mL of a 1 M Cu-TEPA solution was added. The final gel has the following molar ratios: $SiO_2$/0.033 $Al_2O_3$/0.033 Cu-TEPA/0.70 NaOH/34 $H_2O$. This suspension was stirred for 15 min at room temperature and then kept static and heated at 95° C. for 48 h in a closed polypropylene bottle (PP bottle) and is referred to as aluminosilicate solution 1.

Aluminosilicate solution 2 was prepared as follows: 0.28 g aluminium-tri-sec-butoxide (Fluka) was added upon stirring for 5 min at room temperature to 12.43 g tetraethylammonium hydroxide (35 wt.-%, Sigma-Aldrich) in a 60 mL PP bottle. This mixture was stirred mechanically for 10 minutes. To this solution, 5.46 g Ludox® AS-40 (Sigma-Aldrich) was added drop wise within 10 minutes at room temperature upon stirring and afterwards 1.65 g hexamethonium bromide (Acros) was added at once. Another 0.25 g of potassium chloride (LabChem) and 5.02 g of distilled water was added within 2 min. The final gel has the following molar ratios: $SiO_2$/0.015 $Al_2O_3$/0.092 KCl/0.81 TEAOH/0.13 RBr/25 $H_2O$ where R is the hexamethonium organic template. This solution remained stirring for 24 h in the closed PP bottle at room temperature and forms a liquid gel. This gel was aged for another 48 h at room temperature without stirring.

Figure 2:
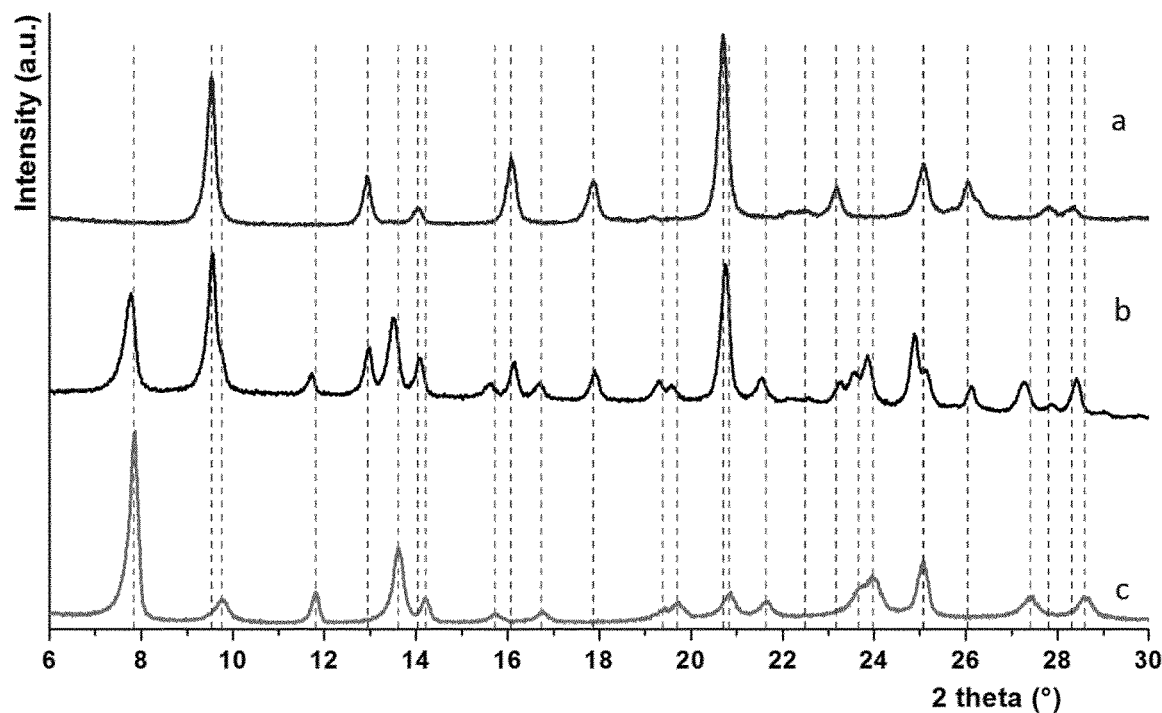
FIG. 2 shows X-Ray diffraction patterns of the calcined ERI/CHA zeolite intergrowth obtained in Embodiment 1, compared to zeolites with a pure CHA framework type according to Comparative Example 1 and a pure ERI framework type according to Comparative Example 3, respectively.

After the aging step, aluminosilicate solution 2 was added at once to aluminosilicate solution 1 at room temperature. The final gel has the following molar ratios: $SiO_2$/0.025 $Al_2O_3$/0.39 NaOH/0.041 KCl/0.018 Cu-TEPA/0.36 TEAOH/0.0553 RBr/30 $H_2O$ where R is the hexamethonium organic template. The resulting mixture was homogenized by vigorous stirring for 15 minutes and afterwards transferred to a stainless steel autoclave. This mixture was heated for 168 h at 160° C. under dynamic conditions under autogenous pressure. The solid product was recovered by filtration and washing with 500 mL deionized water, and was dried at 60° C. for 8 to 16 h. The zeolite was calcined at 750° C. for 8 hours with a temperature ramp of 1° C./min. The zeolite produced has an X-ray diffraction pattern as shown in FIG. 2 with a SAR of 12.6 and 2.7 wt.-% CuO based on the total weight of the zeolite. The amount Na and K is 0.06 wt.-% and 0.25 wt.-%, respectively, calculated as pure metals and based on the total weight of the zeolite. The CHA content of the zeolite is 37 wt.-%, based on the total weight of ERI and CHA and is based on the analysis of the XRD pattern by identifying the relative amount of ERI and CHA in the ERI/CHA intergrowth.

Table 1 shows the Bragg distance, the 2 theta position and the relative intensities of the zeolite obtained in this Embodiment prior to calcination.

Figure 3A:
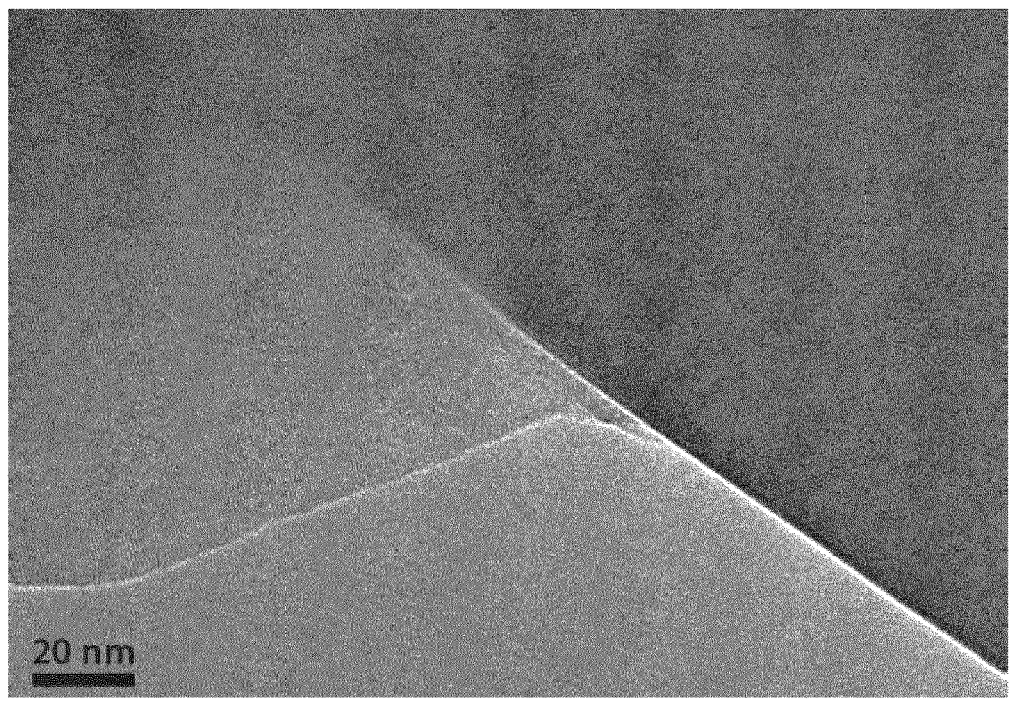
FIG. 3a shows the smaller and FIG. 3b the larger one of the magnifications. The TEM study was performed on the calcined samples. The crystals were dispersed in ethanol and treated by ultrasonication. A few droplets were put onto a holy carbon coated Cu grid. HRTEM images were made using a FEI Tecnai microscope operated at 200 kV.
Figure 3B:
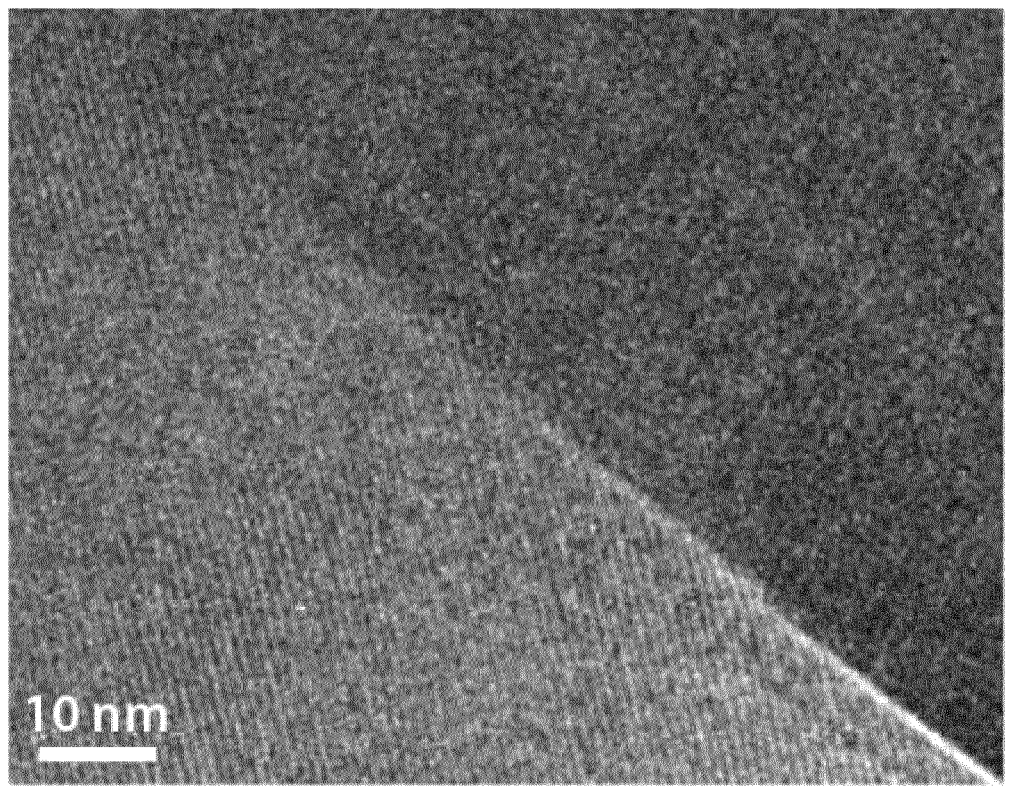
FIG. 3 shows HRTEM images of the zeolite according to Embodiment 1 in two different magnifications.

FIG. 3 shows HRTEM images of the zeolite according to Embodiment 1 in two different magnifications.

TABLE 1

Bragg distance D (Å), 2theta position and relative intensities ($I/I_0$) of the reflections of the zeolite obtained in Embodiment 1

| D (Å) | 2θ (°) | $I/I_0$ |
|---|---|---|
| 11.42 | 7.74 | 72 |
| 9.27 | 9.53 | 46 |
| 9.14 | 9.67 | 38 |
| 7.59 | 11.65 | 27 |
| 6.84 | 12.93 | 22 |
| 6.57 | 13.47 | 29 |
| 6.31 | 14.02 | 36 |
| 5.68 | 15.58 | 32 |
| 5.51 | 16.08 | 50 |
| 5.32 | 16.64 | 28 |
| 4.96 | 17.85 | 35 |
| 4.62 | 19.21 | 26 |
| 4.55 | 19.51 | 38 |
| 4.29 | 20.69 | 100 |
| 4.13 | 21.49 | 32 |
| 4.00 | 22.18 | 17 |
| 3.95 | 22.49 | 19 |
| 3.84 | 23.17 | 20 |
| 3.78 | 23.49 | 41 |
| 3.74 | 23.79 | 43 |
| 3.59 | 24.75 | 52 |
| 3.55 | 25.05 | 31 |
| 3.42 | 26.04 | 26 |
| 3.28 | 27.18 | 30 |
| 3.21 | 27.79 | 17 |
| 3.15 | 28.30 | 29 |
| 3.01 | 29.69 | 16 |
| 2.93 | 30.53 | 18 |
| 2.90 | 30.77 | 37 |
| 2.86 | 31.26 | 28 |
| 2.84 | 31.47 | 47 |
| 2.79 | 32.04 | 23 |
| 2.66 | 33.67 | 17 |
| 2.58 | 34.68 | 15 |
| 2.53 | 35.52 | 11 |
| 2.48 | 36.22 | 18 |
| 2.47 | 36.41 | 15 |
| 2.27 | 39.63 | 10 |
| 2.26 | 39.91 | 10 |
| 2.23 | 40.51 | 8 |
| 2.19 | 41.28 | 9 |
| 2.10 | 43.03 | 13 |
| 2.09 | 43.32 | 14 |
| 2.07 | 43.69 | 10 |
| 1.97 | 46.04 | 9 |
| 1.91 | 47.54 | 13 |
| 1.89 | 47.98 | 15 |
| 1.87 | 48.70 | 8 |
| 1.85 | 49.11 | 9 |
| 1.82 | 50.15 | 10 |
| 1.81 | 50.44 | 9 |
| 1.79 | 50.93 | 9 |
| 1.77 | 51.63 | 13 |
| 1.71 | 53.55 | 8 |
| 1.69 | 54.29 | 7 |
| 1.65 | 55.57 | 8 |
| 1.64 | 56.09 | 11 |
| 1.57 | 58.57 | 10 |
| 1.54 | 59.88 | 7 |
| 1.50 | 61.62 | 9 |
| 1.47 | 63.05 | 6 |
| 1.46 | 63.50 | 6 |
| 1.45 | 64.00 | 7 |
| 1.43 | 65.24 | 7 |
| 1.40 | 67.03 | 7 |

TABLE 1-continued

Bragg distance D (Å), 2theta position and relative intensities ($I/I_0$) of the reflections of the zeolite obtained in Embodiment 1

| D (Å) | 2θ (°) | $I/I_0$ |
|---|---|---|
| 1.37 | 68.16 | 7 |
| 1.37 | 68.69 | 6 |
| 1.36 | 69.19 | 6 |

Embodiment 2

3 g of zeolite Y with SAR=30 (Si/Al=15) (CBV-720, Zeolyst International) was suspended in 27 mL of a 1.2 M solution of sodium hydroxide at room temperature. To this solution 1.5 mL of a 1 M Cu-TEPA solution was added. The final gel has the following molar ratios: $SiO_2$/0.033 $Al_2O_3$/0.033 Cu-TEPA/0.70 NaOH/34 $H_2O$. This suspension was stirred for 15 min and kept static and heated at 95° C. for 48 h in a closed PP bottle and is referred to as aluminosilicate solution 1.

Aluminosilicate solution 2 was prepared as follows. 0.21 g aluminium-tri-sec-butoxide (Fluke) was added upon stirring for 5 min at room temperature to 9.32 g tetraethylammonium hydroxide (35 wt.-%, Sigma-Aldrich) in a 60 mL PP bottle. This mixture was stirred mechanically for 10 minutes. To this solution, 4.1 g Ludox AS-40 (Sigma-Aldrich) was added drop wise upon stirring within 10 min at room temperature and afterwards 1.24 g hexamethonium bromide (Acros) was added at once. Another 0.19 g of potassium chloride (LabChem) and 3.77 g of distilled water was added within 2 min. The final gel has the following molar ratios: $SiO_2$/0.015 $Al_2O_3$/0.092 KCl/0.81 TEAOH/0.13 RBr/25 $H_2O$ where R is the hexamethonium organic template. This solution remained stirring for 24 h in the closed PP bottle at room temperature and forms a liquid gel. This gel was aged for another 48 h at room temperature without stirring.

After the aging step, aluminosilicate solution 2 was added at once to aluminosilicate solution 1 at room temperature. The final gel has the following molar ratios: $SiO_2$/0.026 $Al_2O_3$/0.44 NaOH/0.034 KCl/0.02 Cu-TEPA/0.30 TEAOH/0.047 RBr/31 $H_2O$ where R is the hexamethonium organic template. The resulting mixture was homogenized by vigorously stirring for 15 minutes and afterwards transferred to a stainless steel autoclave. This mixture was heated for 168 h at 160° C. under dynamic conditions and autogenous pressure. The solid product was recovered by filtration, washed with 500 mL deionized water, and dried at 60° C. for 8 to 16 h. The obtained zeolite has a SAR of 13.6 and 3.3 wt.-% CuO based on the total weight of the zeolite. The amount Na and K is 0.58 wt.-% and 1.0 wt.-%, respectively, calculated as pure metals and based on the total weight of the zeolite. The CHA content of the zeolite is 56 wt.-%, based on the total weight of ERI and CHA and is based on the analysis of the XRD pattern by identifying the relative amount of ERI and CHA in the ERI/CHA intergrowth.

Embodiment 3

3 g of zeolite Y with SAR=30 (Si/Al=15) (CBV-720, Zeolyst International) was suspended in 27 mL of a 1.2 M solution of sodium hydroxide at room temperature. To this solution 1.5 mL of a 1 M Cu-TEPA solution was added. The final gel has the following molar ratios: $SiO_2$/0.033 $Al_2O_3$/0.033 Cu-TEPA/0.70 NaOH/34 $H_2O$. This suspension was stirred for 15 min and kept static and heated at 95° C. for 48 h in a closed PP bottle and is referred to as aluminosilicate solution 1.

Aluminosilicate solution 2 was prepared as follows. 0.28 g aluminium-tri-sec-butoxide (Fluka) was added upon stirring to 12.43 g tetraethylammonium hydroxide (35 wt.-%, Sigma-Aldrich) in a 60 mL PP bottle. This mixture was stirred mechanically for 10 minutes. To this solution, 5.46 g Ludox AS-40 (Sigma-Aldrich) was added drop wise upon stirring for 5 min at room temperature and afterwards 1.65 g hexamethonium bromide (Acros) was added at once. Another 0.25 g of potassium chloride (LabChem) and 5.02 g of distilled water was added within 2 min. The final gel has the following molar ratios: $SiO_2$/0.015 $Al_2O_3$/0.092 KCl/0.81 TEAOH/0.13 RBr/25 $H_2O$ where R is the hexamethonium organic template. This solution remained stirring for 24 h in the closed PP bottle at room temperature and forms a liquid gel. This gel was aged for another 48 h at room temperature without stirring.

After the aging step, aluminosilicate solution 2 was added at once to aluminosilicate solution 1 at room temperature. The final gel has the following molar ratios: $SiO_2$/0.025 $Al_2O_3$/0.39 NaOH/0.041 KCl/0.02 Cu-TEPA/0.36 TEAOH/0.055 RBr/30 $H_2O$ where R is the hexamethonium organic template. The resulting mixture was homogenized by vigorously stirring for 15 minutes and heated for 504 h at 95° C. under static conditions and autogenous pressure. The solid product was recovered by filtration and washing with 500 mL deionized water, and was dried at 60° C. for 8 to 16 h. The obtained zeolite has a SAR of 12.9 and 3.9 wt.-% CuO based on the total weight of the zeolite. The amount Na and K is 0.93 wt.-% and 1.7 wt.-%, respectively, calculated as pure metals and based on the total weight of the zeolite. The CHA content of the zeolite is 46 wt.-%, based on the total weight of ERI and CHA and is based on the analysis of the XRD pattern by identifying the relative amount of ERI and CHA in the ERI/CHA intergrowth.

Embodiment 4

3 g of zeolite Y with SAR=12 (Si/Al=6) (CBV-712, Zeolyst International) was suspended at room temperature in a mixture of 14 mL of a 1.2 M solution of sodium hydroxide and 13 mL of a 1.2 M solution of ammonium hydroxide. To this solution 1.5 mL of a 1 M Cu-TEPA solution was added. The final gel has the following molar ratios: $SiO_2$/0.083 $Al_2O_3$/0.036 Cu-TEPA/0.41 NaOH/0.38 $NH_4OH$/38 $H_2O$. This suspension was stirred for 15 min and kept static and heated at 95° C. for 48 h in a closed PP bottle and is referred to as aluminosilicate solution 1.

Aluminosilicate solution 2 was prepared as follows. 0.28 g aluminium-tri-sec-butoxide (Fluka) was added upon stirring to 12.43 g tetraethylammonium hydroxide (35 wt.-%, Sigma-Aldrich) in a 60 mL PP bottle. This mixture was stirred mechanically for 10 minutes. To this solution, 5.46 g Ludox AS-40 (Sigma-Aldrich) was added drop wise upon stirring within 5 min at room temperature and afterwards 1.65 g hexamethonium bromide (Acros) was added at once. Another 0.25 g of potassium chloride (LabChem) and 5.02 g of distilled water was added within 2 min. The final gel has the following molar ratios: $SiO_2$/0.015 $Al_2O_3$/0.092 KCl/0.81 TEAOH/0.13 RBr/25 $H_2O$ where R is the hexamethonium organic template. This solution remained stirring for 24 h in the closed PP bottle at room temperature and forms a liquid gel. This gel was aged for another 48 h at room temperature without stirring.

After the aging step, aluminosilicate solution 2 was added at once to aluminosilicate solution 1 at room temperature. The final gel has the following molar ratios: $SiO_2/0.05$ $Al_2O_3/0.22$ $NaOH/0.20$ $NH_4OH/0.043$ $KCl/0.019$ Cu-TEPA/0.38 TEAOH/0.059 RBr/32 $H_2O$ where R is the hexamethonium organic template. The resulting mixture was homogenized by vigorously stirring for 15 minutes and afterwards transferred to a stainless steel autoclave. This mixture was heated for 168 h at 160° C. under static conditions and autogenous pressure. The solid product was recovered by filtration, washed with 500 mL deionized water, and dried at 60° C. for 8 to 16 h. The obtained zeolite has a SAR of 14.4 and 1.7 wt.-% CuO based on the total weight of the zeolite. The amount Na and K is 0.37 wt.-% and 2.1 wt.-%, respectively, calculated as pure metals and based on the total weight of the zeolite. The CHA content of the zeolite is 20 wt.-%, based on the total weight of ERI and CHA and is based on the analysis of the XRD pattern by identifying the relative amount of ERI and CHA in the ERI/CHA intergrowth.

Embodiment 5

5 g zeolite obtained as described in embodiment 4 is suspended in a 500 mL aqueous solution containing 0.5 M $NH_4Cl$. This mixture is heated at boiling point for 4 hours under reflux condition upon stirring. The zeolite is recovered by filtration and washing with 1 L deionized water, and was dried at 60° C. for 8 to 16 h. Afterwards, this procedure is repeated two times. The amount Na and K was decreased to 0.03 wt.-% and 0.41 wt.-%, calculated as pure metals and based on the total weight of the zeolite. The Cu content was lowered to 0.19 wt.-%, calculated as CuO and based on the total weight of the zeolite.

Embodiment 6

Catalyst pellets consisting of compressed zeolite powder obtained in Embodiment 1 are loaded in a quartz fixed bed tubular continuous flow reactor with on-line reaction product analysis. The catalyst first undergoes a pretreatment under simulated air flow conditions, i.e. 5% $O_2$ and 95% $N_2$, at 450° C., the highest temperature of the catalytic testing. After pretreatment, the catalyst temperature is decreased to 150° C. A typical gas composition for $NH_3$-SCR performance evaluation consists of 500 ppm NO, 450 ppm $NH_3$, 5% $O_2$, 2% $CO_2$, 2.2% $H_2O$. The gas hourly space velocity (GHSV) will be fixed at 30 000 $h^{-1}$, obtained with 0.5 $cm^3$ catalyst bed and a gas flow of 250 mL/min. The temperature will be stepwise increased from 150 to 450° C. with fixed temperature ramps, and 50° C. intervals. Isothermal periods of 60 to 120 minutes are foreseen before reaction product sampling at each temperature plateau. A return point to 150° C. enables detection of degradation of catalytic performance during the testing.

Table 2 shows the $NO_x$ conversion for each temperature measured.

Figure 4:
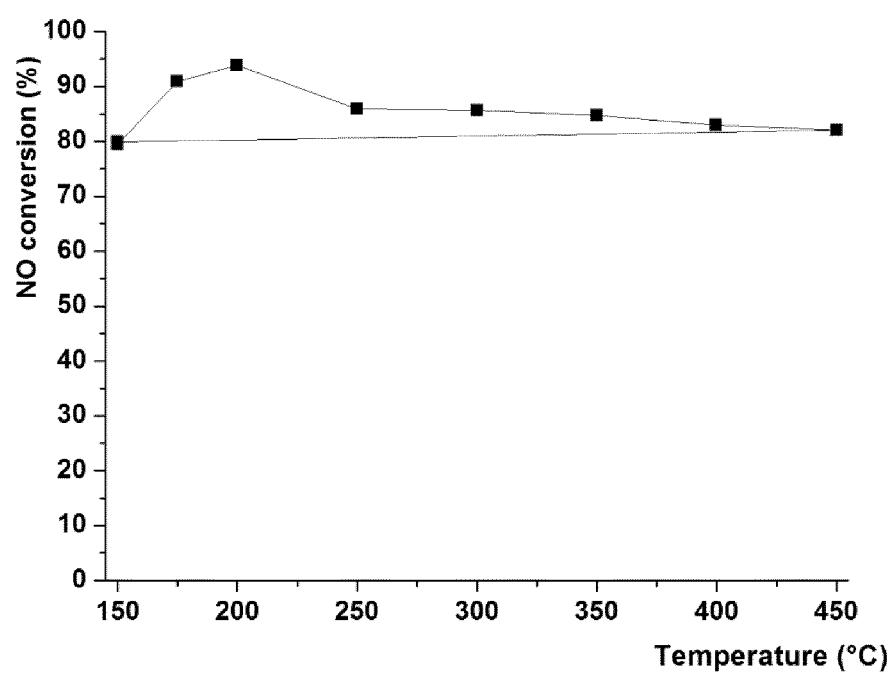
FIG. 4 shows the graphical representation of the $NO_x$ conversion test according to Embodiment 6. The solid line connects the measuring point at 450° C. and the return point at 150° C.

FIG. 4 shows the graphical representation of the $NO_x$ conversion test.

TABLE 2

$NO_x$ conversion of the zeolite powder obtained in Embodiment 1. The gas composition consisted of 500 ppm NO, 450 ppm $NH_3$, 5% $O_2$, 2% $CO_2$, 2.2% $H_2O$, and the gas hourly space velocity (GHSV) was fixed at 30 000 h–1, obtained with 0.5 cm3 catalyst bed and a gas flow of 250 mL/min. The bottom row of the table shows the $NO_x$ conversion at the return point of 150° C. The bottom row demonstrates that there was no degradation of catalytic performance during the testing as the $NO_x$ conversion did not decrease in comparison to the start. The start was also at 150° C., see top row, and the $NO_x$ conversion rates at the start and at the end (top and bottom row) were almost identical.

| Temperature (° C.) | $NO_x$ conversion (%) |
|---|---|
| 150 | 79.4 |
| 175 | 90.9 |
| 200 | 93.8 |
| 250 | 85.9 |
| 300 | 85.6 |
| 350 | 84.7 |
| 400 | 83.0 |
| 450 | 82.0 |
| 150 | 79.9 |

COMPARATIVE EXAMPLE 1

3 g of zeolite Y with SAR=30 (Si/Al=15) (CBV-720, Zeolyst International) was suspended in 27 mL of a 1.2 M solution of sodium hydroxide at room temperature. To this solution 1.5 mL of a 1 M Cu-TEPA solution was added. The final gel has the following molar ratios: $SiO_2/0.033$ $Al_2O_3/$ 0.033 Cu-TEPA/0.70 NaOH/34 $H_2O$. This suspension was stirred for 15 min at room temperature and kept static and heated at 95° C. for 456 h in a closed PP bottle. The zeolite produced has an X-ray diffraction pattern corresponding to a pure CHA framework type.

COMPARATIVE EXAMPLE 2

0.28 g aluminium-tri-sec-butoxide (Fluka) was added upon stirring to 12.43 g tetraethylammonium hydroxide (35 wt.-%, Sigma-Aldrich) in a 60 mL PP bottle at room temperature. This mixture was stirred mechanically for 10 minutes. To this solution, 5.46 g Ludox AS-40 (Sigma-Aldrich) was added drop wise upon stirring within 5 min at room temperature and afterwards 1.65 g hexamethonium bromide (Acros) was added at once. Another 0.25 g of potassium chloride (LabChem) and 5.02 g of distilled water was added slowly. The final gel has the following molar ratios: $SiO_2/0.015$ $Al_2O_3/0.092$ KCl/0.81 TEAOH/0.13 RBr/ 25 $H_2O$ where R is the hexamethonium organic template. This solution remained stirring for 24 h in the closed PP bottle at room temperature and forms a liquid gel. This mixture was heated for 168 h at 160° C. under dynamic conditions under autogenous pressure. The solid product was recovered by filtration and washing with 500 mL deionized water and was dried at 60° C. overnight. The zeolite produced has an X-ray diffraction pattern corresponding to crystalline material but not as an ERI framework type. The product obtained was a mixture of different zeolite frameworks.

COMPARATIVE EXAMPLE 3

0.28 g aluminium-tri-sec-butoxide (Fluka) was added upon stirring to 12.43 g tetraethylammonium hydroxide (35 wt.-%, Sigma-Aldrich) in a 60 mL PP bottle at room temperature. This mixture was stirred mechanically for 10 minutes. To this solution, 5.46 g Ludox AS-40 (Sigma- Aldrich) was added drop wise upon stirring within 5 min at room temperature and afterwards 1.65 g hexamethonium bromide (Acros) was added at once. Another 0.25 g of potassium chloride (LabChem) and 5.02 g of distilled water was added slowly within 10 min at room temperature. The final gel has the following molar ratios: $SiO_2/0.015\ Al_2O_3/0.092\ KCl/0.81\ TEAOH/0.13\ RBr/25\ H_2O$ where R is the hexamethonium organic template. This solution remained stirring for 24 h in the closed PP bottle at room temperature and forms a liquid gel. This mixture was heated for 336 h at 100° C. under dynamic conditions under autogenous pressure. The solid product was recovered by filtration and washing with 500 mL deionized water, and was dried at 60° C. for 8 to 16 h. The zeolite produced has an X-ray diffraction pattern corresponding to a pure ERI framework type.

Table 2 shows the Bragg distances, the 2 theta positions and the relative intensities of the zeolite obtained in Embodiment 1 after to calcination, i.e. the ERI/CHA zeolite according to the present invention, as well as the corresponding values of the CHA framework type zeolite according to Comparative Example 1, and of the ERI framework zeolite according to Comparative Example 3, respectively.

TABLE 3

Position and relative intensities of reflections of the calcined ERI/CHA zeolite according to Embodiment 1 compared to zeolites with pure ERI or CHA framework type as obtained in Comparative Examples 3 and 1, respectively

| ERI/CHA Embodiment 1 | | CHA framework type Comparative Example 1 | | ERI framework type Comparative Example 3 | |
| --- | --- | --- | --- | --- | --- |
| 2Θ (°) | I/I₀ | 2Θ (°) | I/I₀ | 2Θ (°) | I/I₀ |
| 7.77 | 81 | 7.85 | 100 | | |
| 9.56 | 100 | | | 9.54 | 79 |
| 9.76 | 53 | 9.77 | 20 | | |
| 11.72 | 42 | 11.82 | 23 | | |
| 12.97 | 54 | | | 12.95 | 31 |
| 13.51 | 69 | 13.62 | 44 | | |
| 14.08 | 50 | | | 14.04 | 17 |
| 14.08 | 50 | 14.21 | 20 | | |
| 15.61 | 38 | 15.72 | 12 | | |
| 16.13 | 47 | | | 16.08 | 40 |
| 16.69 | 38 | 16.74 | 13 | | |
| 17.91 | 43 | | | 17.88 | 29 |
| 19.31 | 39 | | | 19.17 | 13 |
| 19.31 | 39 | 19.39 | 15 | | |
| 19.57 | 37 | 19.71 | 18 | | |
| 20.75 | 95 | | | 20.71 | 100 |
| 20.75 | 95 | 20.84 | 22 | | |
| 21.54 | 41 | 21.64 | 19 | | |
| 22.14 | 30 | | | 22.15 | 15 |
| 22.57 | 31 | | | 22.49 | 16 |
| 23.26 | 39 | | | 23.17 | 26 |
| 23.58 | 43 | 23.67 | 26 | | |
| 23.86 | 50 | 23.99 | 31 | | |
| 24.89 | 62 | 25.07 | 37 | | |
| 25.14 | 44 | | | 25.08 | 37 |
| 26.12 | 36 | | | 26.05 | 29 |
| 27.28 | 39 | 27.42 | 21 | | |
| 27.87 | 28 | | | 27.81 | 17 |
| 28.41 | 40 | | | 28.31 | 17 |
| 28.41 | 40 | 28.59 | 20 | | |
| 30.86 | 51 | | | 30.78 | 63 |
| 31.39 | 39 | | | 31.22 | 32 |
| 31.58 | 49 | 31.75 | 28 | | |

Some of the 2Θ values of the ERI/CHA zeolite according to Embodiment 1 are listed twice in the above table 3 because they correspond to 2Θ values of pure CHA and pure ERI, respectively. These 2Θ values are listed in table 4

TABLE 4

2Θ values of the ERI/CHA intergrowth according to the present invention and the respective 2Θ values of pure CHA and pure ERI.

| 2Θ ERI/CHA intergrowth (°) | 2Θ CHA (°) | 2Θ ERI (°) |
| --- | --- | --- |
| 14.08 | 14.21 | 14.04 |
| 19.31 | 19.39 | 19.17 |
| 20.75 | 20.84 | 20.71 |
| 28.41 | 28.59 | 28.31 |

The invention claimed is:

1. A process for making a crystalline aluminosilicate zeolite composition comprising an intergrowth of a CHA framework type material and an EM framework type material, said process comprising the following steps:
   a) preparing a first aqueous reaction mixture comprising a zeolite of the faujasite framework type, Cu-tetraethylenepentamine (Cu-TEPA) and at least one compound M(OH), wherein M is a sodium, potassium, or ammonium cation or a mixture thereof,
   b) preparing a second aqueous reaction mixture comprising
      a silica source,
      an alumina source,
      at least one salt AB or $AB_2$, wherein A is chosen from lithium, sodium, potassium, rubidium, cesium, ammonium, magnesium, calcium, strontium, and barium and B is chosen from chloride, bromide, iodide, and hydroxide, and
      a quaternary alkylammonium salt having the general formula $[NR1R2R3R4]^+X^-$, wherein R1, R2, R3, and R4 represent, independently from one another, a linear or branched alkyl group having 1 to 10 carbon atoms and $X^-$ is chosen from bromide, iodide, and hydroxide, and
      a hexamethonium bromide, iodide, or hydroxide,
   c) combining the two aqueous reaction mixtures,
   d) incubating the combination of the two aqueous reaction mixtures for at least 3 days at a temperature of 95° C. to 160° C. under dynamic conditions to form the crystalline aluminosilicate zeolite composition.

2. The process for making crystalline aluminosilicate zeolite composition according to claim 1, wherein the Cu-TEPA in step a) is used in an amount of 0.0001 mole/wt Cu-TEPA/zeolite of the faujasite framework type to 0.0016 mole/wt Cu-TEPA/zeolite of the faujasite framework type.

3. The process for making crystalline aluminosilicate zeolite composition according to claim 1, wherein the compound M(OH) in step a) is used in an amount of 0.001 mole/wt M(OH)/zeolite of the faujasite framework type to 0.025 mole/wt M(OH)/zeolite of the faujasite framework type.

4. The process for making crystalline aluminosilicate zeolite composition according to claim 1, wherein the zeolite composition obtained from step d) is subsequently calcined.

5. The process for making crystalline aluminosilicate zeolite composition according to claim 1, wherein the zeolite composition obtained after calcination is ion-exchanged in order to reduce the amount of alkali, alkaline earth metal, and copper cations.

6. A crystalline aluminosilicate zeolite composition comprising an intergrowth of a CHA framework type material and an ERI framework type material, said zeolite made by the process according to claim 2.

7. The crystalline aluminosilicate zeolite composition according to claim 6, wherein the EM content ranges from 10 to 85 wt.-%, based on the total weight of ERI and CHA combined.

8. The crystalline aluminosilicate zeolite composition according to claim 6, wherein the silica to alumina molar ratio ranges from 2 to 60.

9. The crystalline aluminosilicate zeolite composition according to claim 6, wherein the zeolite composition comprises copper in an amount of 0.1 to 10 wt.-%, calculated as CuO and based in on the total weight of the respective zeolite composition.

10. The crystalline aluminosilicate zeolite composition according to claim 9, wherein the copper to aluminum atomic ratio is in the range of between 0.002 to 0.5.

11. The crystalline aluminosilicate zeolite composition according to claim 6, wherein the zeolite composition comprises one or more alkali or alkaline earth metal cations selected from the group consisting of lithium, sodium, potassium, rubidium, cesium, ammonium, magnesium, calcium, strontium, and barium in an amount of 0.1 to 5.0 wt.-%, calculated as pure metals and based on the total weight of the zeolites.

12. The crystalline aluminosilicate zeolite composition according to claim 6, wherein the mixture is incubated for at least 4 days.

13. The crystalline aluminosilicate zeolite composition according to claim 12, wherein the mixture is incubated for at least 7 days.

14. The crystalline aluminosilicate zeolite composition according to claim 12, wherein the first aqueous reaction mixture and/or the second aqueous reaction mixture are aged before mixing together.

15. The crystalline aluminosilicate zeolite composition according to claim 12, wherein the first aqueous reaction mixture and the second aqueous reaction mixture are aged for 48 hours before mixing together.

16. A washcoat comprising a crystalline aluminosilicate zeolite composition according to claim 6.

17. An SCR catalyst comprising a crystalline aluminosilicate zeolite composition according to claim 6.

18. An SCR catalyst comprising the washcoat according to claim 16.

19. An exhaust gas purification system containing an SCR catalyst according to claim 6.

20. A method of performing SCR catalysis, which comprises contacting an exhaust gas with a crystalline aluminosilicate zeolite composition according to claim 6 as the catalyst.

* * * * *